United States Patent
Belokin, Jr.

[11] 4,032,031
[45] June 28, 1977

[54] PLASTIC DRUM WITH LIFT RING

[75] Inventor: Paul Belokin, Jr., Hayward, Wis.

[73] Assignee: K and M Rubber Company, Elk Grove Village, Ill.

[22] Filed: Oct. 12, 1976

[21] Appl. No.: 731,621

[52] U.S. Cl. .................................. 220/85 R; 220/72
[51] Int. Cl.² ..................... B65D 25/00; B65D 7/42
[58] Field of Search ............... 220/85 R, 5 R, 23.4, 220/72; 214/372, 374, 377, 378, 379; 294/31.2, 90; 248/129

[56] References Cited
UNITED STATES PATENTS

| | | | |
|---|---|---|---|
| 2,790,669 | 4/1957 | Crawford | 294/31.2 |
| 2,832,630 | 4/1958 | Sterling | 294/90 X |
| 3,052,441 | 9/1962 | Fleischman | 214/374 X |
| 3,365,228 | 1/1968 | Hay | 294/31.2 |

*Primary Examiner*—William Price
*Assistant Examiner*—Steven M. Pollard
*Attorney, Agent, or Firm*—Silverman & Cass, Ltd.

[57] ABSTRACT

A circlet or lift ring is loosely affixed between the annular roll ridges of a conventional polyethylene drum to enable the drum to be secured to a conventional hand truck utilizing the standard hand truck hook. The circlet is formed with a diameter greater than the diameter of the drum, but smaller than the outer diameter of the roll ridges. The circlet is thus loosely, but securely affixed between the roll ridges with sufficient space between the circlet and the drum easily to be engaged by a standard hand truck hook to enable the drum to be handled easily on the truck.

4 Claims, 3 Drawing Figures

PLASTIC DRUM WITH LIFT RING

BACKGROUND OF THE INVENTION

The invention relates to the transporting of polyethylene drums by hand trucks and more particularly to the combination of such drum with a circlet or lift ring which is mounted on the drums to be engaged by the hook of conventional hand trucks to secure the drum to the trucks.

Current use of polyethylene or other synthetic material drums has brought about a need for convenient means for securing these drums to a conventional hand truck. The conventional type of hand truck has a vertically slidable, downwardly engaging, hook which is used to secure a regular steel drum with an upstanding rim to the hand truck to enable trundling the drum. The bottom of the hand truck has a platform or pair of arms or a fork which is engaged under the drum after which the hook is moved upward and the truck tilted forward to engage the hook over the rim of the steel drum. The drum and truck are then tilted backwards, with the drum secured to the truck by the hook and platform, to enable moving the drum to different locations.

Utilizing the conventional hand truck with a polyethylene or other synthetic material drum poses a problem in that these drums typically have substantially rimless axial ends so that there is no robust and non-yielding protrusion to be engaged by the hand truck hook as there is in the case of steel drums. These plastic drums may have a boss with bung hole on one or both ends of the drum. It has been proposed to use a type of slidable hook which will attach over the bung hole boss; however, this requires a modification of the hand truck hook causing additional expense and furthermore, the hook may slip from the boss resulting in loss of control of the drum.

The bung hole of the drum may also be on the side of the drum rather than on one end of the drum. In this location, even the modified hand truck hook will not be operable to secure the drum to the hand truck.

SUMMARY OF THE INVENTION

The above and other disadvantages of prior art devices and techniques to secure drums to conventional hand trucks are overcome in accordance with the present invention by providing a circlet or lift ring affixed to the drum between the roll ridges at one end of the drum that is readily engageable by the standard slidable hook of the hand truck without modification thereof. The circlet may be formed of standard steel strapping which is affixed as a loose ring between the roll ridges of the polyethylene drum at one or both ends of the drum. The circlet is of a larger diameter than the diameter of the drum between the roll ridges, but of a smaller diameter than the outer diameter of the roll ridges themselves. This allows the circlet to hang loosely between the roll ridges without slipping off, and yet enables the circlet to be engaged easily by the truck hook when it is desired to transport the drum.

DESCRIPTION OF THE PREFERRED EMBODIMENT

As indicated above, the invention is concerned with the combination of a polythylene drum and a circlet or lift ring for mounting the drum to a conventional hand truck without modifying the hand truck.

Figure 1:
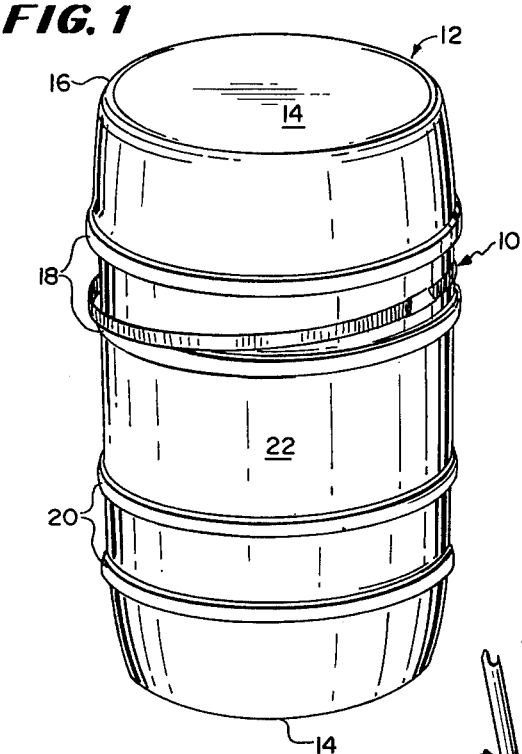
FIG. 1 is a perspective view of the invention showing the circlet mounted between the roll ridges of a conventional polyethylene drum.

Referring now to FIG. 1, the circlet of the invention is designated generally at 10 affixed to a conventional polyethylene drum 12. The polyethylene drum 12 may be formed of other types of synthetic material, but each of these have in common the fact that each end 14 of the drum is substantially smooth and has a rounded or at least substantially smooth rimless edge 16. Even rims which wound be formed are neither safe nor reliable for securement by hand truck hooks.

The conventional configuration of the drum 12 includes at least a pair of roll or reinforcing ridges 18. The reinforcing ridges 18 are generally located toward one end of the drum and generally have a second matching pair of roll ridges 20 at the opposite end of the drum. The drum 12 will have a bung hole usually formed in a boss (not shown) which may be located on one of the ends 14 of the drum or may be located on an unobstructed side portion 22 of the drum 12.

Figure 2:
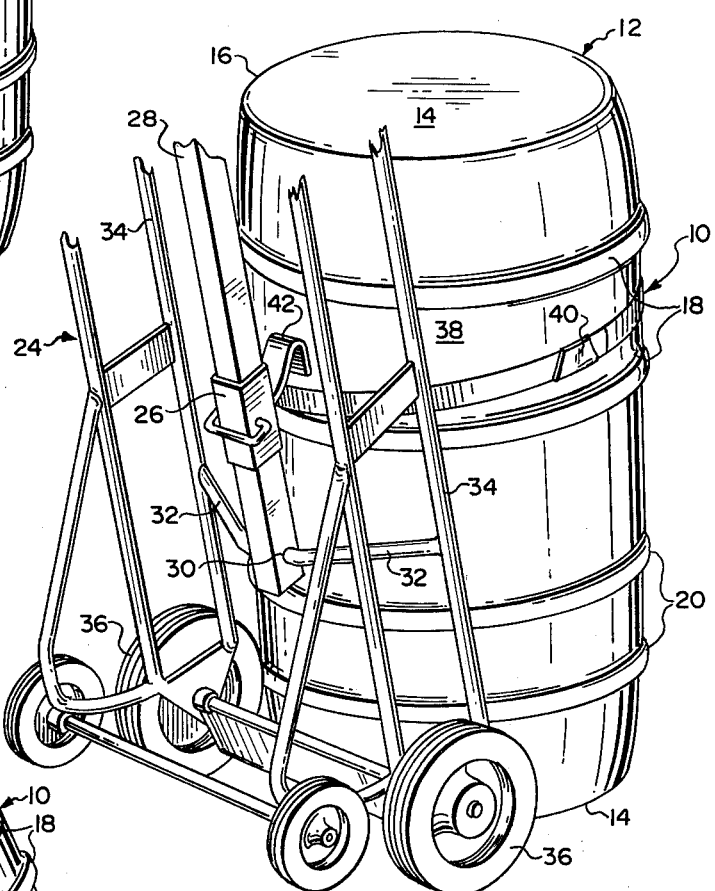
FIG. 2 is a perspective view of a conventional hand truck which is partially illustrated, poised in position to engage the drum and the circlet of the invention.

Referring now to FIG. 2, a conventional hand truck is partially illustrated generally at 24. The particular configuration of the hand truck 24 is not limited to that illustrated, but in general may be of any type which has a slidable hook 26. The hook 26 is slidably mounted on a post 28, which enables the hook to be translated from an upper limiting position (not shown) to a lower limiting position 30 which is formed by crossbars 32 attached to frame members 34. The upper ends of the frame members 34 (not shown) generally form a handle or may be provided with a handle to facilitate manipulating the hand truck.

In using the hand truck to transport a standard metal drum with an upstanding rim at the edge 16, the hook 26 is hooked over the upstanding rim to secure the steel drum. The hand truck is then tilted backward and engages onto a bottom platform or set of arms of the hand truck (not shown) which has previously been engaged beneath the bottom end of the drum. The steel drum or barrel is then firmly secured to the truck and the truck 24 and the steel barrel may then be trundled in a balanced condition on wheels 36 as desired.

The conventional polyethylene drum 12, as illustrated, normally has a smooth or relatively unobstructed edge 16 which will not accommodate the hook 26, and therefore the standard hand truck may not be easily utilized with the polyethylene drum. To solve this problem the circlet 10 of the invention is affixed to the drum 12 on a portion 38 of the drum 12 between the pair of roll ridges 18. The circlet 10 may be formed from conventional steel strapping with the ends of the strapping secured together by any convenient means such as a clamp 40. Steel strapping apparatus joins strap ends by means of crimped clips conventionally, and these are the preferred form of clamp 40. The clamp 40 is permanently affixed to the ends of the strapping to form a permanent circlet preferably, but a detachable type of clamp may be used within the purview of the invention so that the circlet 10 may be removed if desired.

The slidable hook 26 has a downwardly directed blade member 42 which is generally used to engage upon the rim of a steel drum. The circlet 10 is formed with an inside diameter greater than the diameter of the portion 38 of the drum between the roll ridges, but smaller than the outside diameter of the roll ridges 18. On this account the circlet 10 will not become detached from the drum 12; however, there is a generous space between the inside of the circlet 10 and the drum body portion 38.

Figure 3:
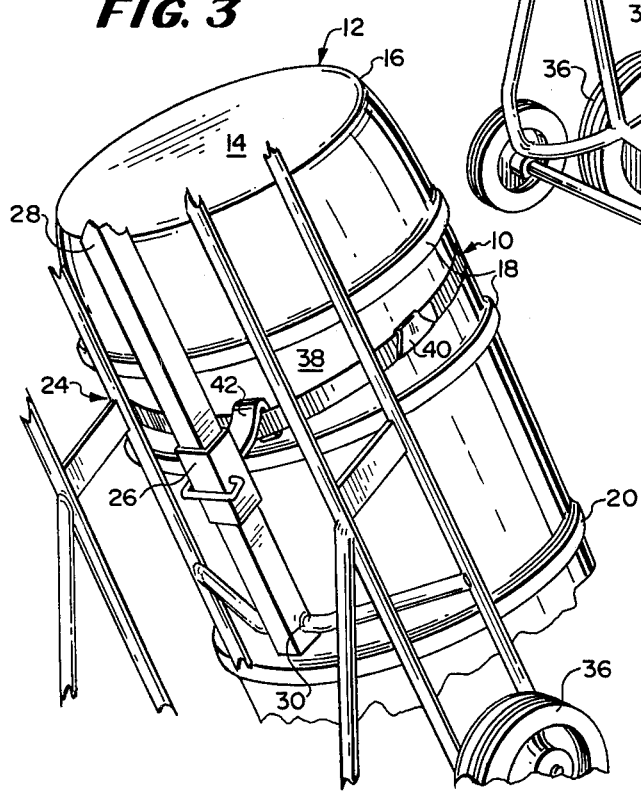
FIG. 3 is a partial perspective view of the hand truck with the hook engaged with the circlet of the invention, securing the drum to the hand truck.

In utilizing the conventional hand truck 24 and slidable hook 26 with the invention, the hook 26 is moved until the bottom edge of the blade member 42 is just above the circlet 10. The bottom platform or fork of the hand truck has been inserted beneath the bottom end of the drum 12 prior to engaging the blade member 42 onto the circlet 10. As best illustrated in FIG. 3, the slidable hook 26 has been pushed downwardly by the operator until the blade member 42 is firmly wedged between the surface of the drum portion 38 and the inner surface of the circlet 10. The drum 12 and the hand truck 24 are then tilted backward onto the wheels 36 as shown. The polyethylene drum 12 is thus firmly secured to the hand truck 24 and the hand truck and drum may then be moved to any desired location in the usual manner.

The operation is, of course, reversed when the drum has been moved to the new desired position, by raising the slidable hook 26 to withdraw the blade member 42 to release the drum 12 after the drum has been lowered to its vertical standing position (FIG. 2) from the tilted position.

With the bung hole in the side or for that matter with bung holes in each end of the drum it may be desirable to have a second circlet affixed between the second pair of roll ridges 20. It will then be convenient to stand the drum on either end without having to turn the drum over to secure it to the hand truck.

Modifications and variations of the present invention are possible in light of the above teachings. The circlet 10 has been described as being made from standard steel strapping, but it could be made from any inexpensive material having the desired strength such as re-enforced fabric bands, plastic belts, etc. It is, therefore, to be understood that within the scope of the appended claims the invention may be practiced otherwise than as specifically described.

What is claimed and desired to be secured by Letters Patent of the United States is:

1. In combination with a drum of synthetic material of the type which has relatively unobstructed substantially rimless ends not readily engageable for handling and having at least one pair of annular roll ridges spaced apart on the exterior of and located near one axial end of the drum, means for securing the drum to a hand truck that has a downwardly engaging hook device thereon, said means comprising:
    a loose circlet of a diameter greater than the diameter of the drum between said roll ridges and smaller than the outer diameter of said roll ridges, formed of a material having sufficient strength to withstand the tension applied in handling said drum through the engagement of said hand truck hook device with the circlet, between the circlet and the drum surface between said roll ridges.
2. The combination as claimed in claim 1 wherein:
    said loose circlet material is a length of steel strapping having its ends secured by means of a clamp.
3. The combination as claimed in claim 1, further including a second pair of annular roll ridges located near the opposite end of said drum, wherein said means for securing the drum include:
    a second loose circlet substantially the same as said first circlet affixed between said second pair of roll ridges.
4. The combination as claimed in claim 1 wherein:
    said circlet is permanently affixed between said roll ridges.

* * * * *